United States Patent
Hoorzad et al.

(10) Patent No.: US 11,166,115 B2
(45) Date of Patent: Nov. 2, 2021

(54) DEVICE AND METHOD FOR HEARING DEVICE CUSTOMIZATION

(71) Applicant: GN Hearing A/S, Ballerup (DK)

(72) Inventors: Mehdi Hoorzad, Minneapolis, MN (US); Kexia Sun, Eden Prairie, MN (US); Jesper Thaysen, Skovlunde (DK); Vince Maye, Ballerup (DK)

(73) Assignee: GN Hearing A/S, Ballerup (DK)

( * ) Notice: Subject to any disclaimer, the term of this patent is extended or adjusted under 35 U.S.C. 154(b) by 38 days.

(21) Appl. No.: 16/164,783

(22) Filed: Oct. 18, 2018

(65) Prior Publication Data

US 2020/0128342 A1     Apr. 23, 2020

(51) Int. Cl.
| | |
|---|---|
| G06T 7/00 | (2017.01) |
| H04R 25/00 | (2006.01) |
| G06T 7/73 | (2017.01) |
| G06K 9/00 | (2006.01) |
| G06T 7/60 | (2017.01) |
| G06T 7/50 | (2017.01) |

(52) U.S. Cl.
CPC ....... *H04R 25/658* (2013.01); *G06K 9/00362* (2013.01); *G06T 7/75* (2017.01); *G06T 7/50* (2017.01); *G06T 7/60* (2013.01); *G06T 2207/20101* (2013.01); *G06T 2207/30004* (2013.01)

(58) Field of Classification Search
CPC ......................... H04R 2225/77; H04R 25/652; H04R 25/658; A61B 2576/02; A61B 5/6815; G06F 30/00; G06K 9/469
See application file for complete search history.

(56) References Cited

U.S. PATENT DOCUMENTS

| | | |
|---|---|---|
| 2004/0196995 A1 | 10/2004 | Roth et al. |
| 2006/0133634 A1 | 6/2006 | Berg |
| (Continued) | | |

FOREIGN PATENT DOCUMENTS

| | | |
|---|---|---|
| EP | 1761109 | 3/2007 |
| EP | 2 178 012 A1 | 4/2010 |
| WO | WO 2006/103236 | 10/2006 |

OTHER PUBLICATIONS

Zouhar, Alexander, et al. "Anatomically-aware, automatic, and fast registration of 3D ear impression models." Third International Symposium on 3D Data Processing, Visualization, and Transmission (3DPVT'06). IEEE, 2006.*

(Continued)

*Primary Examiner* — Li Liu
(74) *Attorney, Agent, or Firm* — Vista IP Law Group, LLP

(57) ABSTRACT

A method and a device for determining a device parameter of a hearing device to be worn at the ear of a user, the method comprising: obtaining image data of one or more images, the image data including first image data of a first image of the outer human ear at a first angle; identifying, based on the first image data, a first anatomical landmark and a second anatomical landmark of the outer human ear using a processor; identifying the position of the first anatomical landmark and the second anatomical landmark in the first image; determining the device parameter of the hearing device based on the first anatomical landmark and the second anatomical landmark; and outputting the device parameter.

20 Claims, 3 Drawing Sheets

(56) References Cited

U.S. PATENT DOCUMENTS

| | | | |
|---|---|---|---|
| 2006/0204013 A1* | 9/2006 | Hannibal | H04R 25/70 |
| | | | 381/60 |
| 2007/0050073 A1* | 3/2007 | Unal | G06K 9/469 |
| | | | 700/118 |
| 2008/0232618 A1* | 9/2008 | Johannesson | G06F 30/23 |
| | | | 381/312 |
| 2009/0123001 A1* | 5/2009 | Kiepfer | H04R 25/65 |
| | | | 381/60 |
| 2010/0094446 A1* | 4/2010 | Baloch | G06F 30/00 |
| | | | 700/98 |
| 2010/0103170 A1 | 4/2010 | Baloch et al. | |
| 2011/0290005 A1* | 12/2011 | Hart | G01B 11/00 |
| | | | 73/37.9 |
| 2012/0242815 A1 | 9/2012 | Burgett et al. | |
| 2014/0056452 A1* | 2/2014 | Moss | H04R 25/30 |
| | | | 381/323 |
| 2014/0343900 A1 | 11/2014 | Goldstein et al. | |
| 2015/0264496 A1 | 9/2015 | Reber et al. | |
| 2017/0127199 A1 | 5/2017 | Marxen et al. | |
| 2018/0132764 A1 | 5/2018 | Jain | |

OTHER PUBLICATIONS

Partial European Search Report dated Mar. 18, 2020 for corresponding EP Application No. 19202151.9.

Search Report and Written Opinion dated Jun. 20, 2019 for corresponding DK Application No. PA 2018 70795.

European Search Report and Written Opinion for EP Patent Appln. No. EP 06 11 9501 dated May 22, 2007.

Office communication regarding intent to grant, and text intended for grant for European patent application No. 19200151.9 dated Mar. 12, 2021.

* cited by examiner

DEVICE AND METHOD FOR HEARING DEVICE CUSTOMIZATION

FIELD

The present disclosure relates to a device and related method for customizing hearing devices.

BACKGROUND

Hearing devices are in many instances customized for the specific user, where one of the factors for customization is to customize the physical appearance and the dimensions of the hearing device. This is often done in order to optimize the users experience of using the hearing device, and also to minimize the visual effect a hearing device has on a user, in an attempt to make the device as discrete as possible.

The customization is performed in many cases by attempting to choose a correct housing for the hearing device, and then the hearing device is constructed out of components, that are connected to each other using a tubular connector, to provide the tubular connector in a correct length. In order to do this, it is important to measure the dimensions of the ear in some way, where the shape of the ear as well as anatomical landmarks are measured to provide the sufficient information to provide a hearing device that fits the user in a correct manner.

The measurement of the ear is often done in decentralized locations, i.e. by a local provider or dispenser of hearing aids, and the measurements are sent to a centralized location where the device is customized for the specific user.

However, it has been realized by the manufacturers of hearing aids, hearing devices, that the measurements are in many cases incorrect, so when a hearing aid and/or a hearing device is delivered to a user, the dimensions of the elements are not suitable for the specific user. This means that the dispenser has to ship the hearing device back to the centralized location so that the hearing device can be re-adjusted to the dimensions of the specific user. This procedure creates both a delay of delivery of the device to the user, as well as an increased cost in the manufacturing of the device for the specific user.

SUMMARY

Accordingly, there is a need for methods with improved personalisation of hearing devices.

In accordance with the present description there is provided a method for determining a device parameter of a hearing device to be worn at the ear of a user, the method comprising: obtaining image data of one or more images, the image data including first image data of a first image of the outer human ear at a first angle; identifying, based on the first image data, a first anatomical landmark and a second anatomical landmark of the outer human ear using a processor; identifying the position of the first anatomical landmark and the second anatomical landmark in the first image; determining the device parameter of the hearing device based on the first anatomical landmark and the second anatomical landmark; and outputting the device parameter.

A hearing device for a specific user has to be adjusted for the user, as human ears differ from person to person, and it is very unlikely that two different users have similar or identical ears. Thus, it may be desirable to be able to adapt the size, form or other physical features of the hearing device based on the ear of the user that is to use the hearing device. By identifying a first anatomical landmark and a second anatomical landmark from the image data it is possible to utilize the first and the second anatomical landmarks for the production, manufacturing or the customization of a hearing device for the specific user.

The first and the second anatomical landmarks of the human ear may be identified for a specific device parameter, where e.g. the curvature of the helix, and/or the back side of the antihelix gives an indication on which shape the housing of the hearing device has to be, in order to provide a suitable fit for the hearing device, or to ensure that the housing is capable of maintaining its position during use. Another example may e.g. be an identification of the size of the proximal part of the ear canal, where the first and the second anatomical landmarks could be the anterior and posterior edges of the ear canal, which may be identified in an image. This size might have an influence on the device parameter of the size or shape of the earpiece of the hearing device.

By obtaining the first and second anatomical landmarks from the image data, it may be possible to reduce any measurement errors that might occur when an individual, such as a dispenser, attempts to measure the distance between two landmarks of the ear, or a specific curvature, or other types of measurements that could occur in a decentralized location. By identifying the position of the first and the second anatomical landmarks, it is possible to determine the shape, size, form or other attributes of the human ear, in order to accurately determine the device parameter, and also allow a central processing of the image in order to confirm or double check the measurements that may e.g. have been made by a dispenser. The customization and/or production of a hearing device has a relatively small margin of error, and a positioning or a measurement that may be 1-2 mm off, can mean that the hearing device does not fit properly to the ear of the user. The improper fit can cause a long-term discomfort of the hearing device, or that a hearing instrument can easily be lost due to the improper fit. By obtaining an image of the ear and identifying the first and the second anatomical landmarks from the image, it is possible to utilize the method to provide the only measurement leading to the device parameter, or to provide quality control of any measurement made by a dispenser. Thus, any positioning of the landmarks of the ear may be performed centrally, which means that there is less risk that the hearing device does not fit the ear of the user, when the customized hearing device is delivered to the user.

The obtaining of the image data may be performed by taking one or more, such as a plurality of, photographs of the outer human ear and/or the surrounding anatomical features, a 3D scan of the outer human ear and/or the surrounding anatomical features.

In one or more embodiments, the image data may be transferred into a processing unit, where the anatomical landmarks may be identified, by automatic or manual means or in a combination of both. This means that the image data may be introduced into the processing unit, and in one example the image data may be projected onto a screen, where an operator can choose the first and/or the second anatomical landmark from the screen, and the processing unit will determine the device parameter based on the selection done by the operator. Alternatively, the selection of landmarks may be done automatically, where the processing unit identifies the first and/or the second anatomical landmark and based on the identification the processor determines the device parameter. Yet further, the processing unit may be utilized in a combination of an automatic and a manual method, where the processing unit may provide identification of the anatomical landmarks, where the image data is projected onto a screen, showing the locations, and the operator can confirm or alter the identification of the position of the landmarks, and following this, the processor determines the device parameter.

In one or more embodiments, the method may further comprise applying a reference model of the outer human ear. By applying a reference model of the outer human ear to the method, the reference model may assist the processor in identifying the correct landmarks. The reference model may be configured to introduce into the method a model of a human ear, where each of the anatomical landmarks are identified and labelled in the reference model, and optionally include rules for the processor to identify specific anatomical landmarks, in order to simplify the processing of the image. For example, if the method is to find or identify a specific anatomical landmark, the reference model of the human ear can introduce a limitation to the processing unit, so that the processing unit searches for the landmark in a specific area of the image. This means that the reference model may assist in preventing that the processing unit is e.g. searching for the helix close to the earlobe and identifies the part of the image of the human ear which has a higher probability of containing information on the helix of the human ear. This may increase the reliability of the method, and thereby reduce the risk that an anatomical landmark is found in an incorrect position, and thereby increase the likelihood that the device parameter is determined in a correct manner.

In one or more embodiments the first anatomical landmark and the second anatomical landmark may be recognizable anatomical features of an outer human ear. The recognizable anatomical features are e.g. features that are visible and/or may be identified by the human eye. By providing e.g. a photographic image of the outer human ear, the landmarks can be identified from the image by various means. The same might be stated if the image is a 3D image of the outer human ear.

The first and/or the second anatomical landmark or any further landmarks may be an anatomical feature of an ear, or may be part of the anatomical features that surround the human ear, such as anatomical landmarks in the Temporal region, the Zygomatic region, Buccal Region, Occipital Region, or other regions that may be included in image data that is included when image data is captured of the outer human ear.

In one or more embodiments, the first anatomical landmark and/or the second anatomical landmark may be chosen from the group of Helix, Crus Antihelcis, Fossa Triangularis, Crus Helics, Antihelix, Cavum Concae, Tragus, Antitragus, Lobule, External acoustic meatus, External auditory meatus, intertragic Notch, and Cymba Concae. Any other known recognizable anatomical features of the outer human ear may be chosen as the first and/or the second anatomical landmark and may advantageously be utilized to obtain a specific device parameter. In an exemplary method, e.g. where the device parameter is the length of the hearing tube, the first anatomical landmark may be the Helix and the second anatomical landmark may be the Tragus.

In one or more embodiments the method may further comprise obtaining a hearing device model identifier, and wherein identifying a first anatomical landmark and a second anatomical landmark of the outer human ear using a processor is based on the hearing device model identifier. This means that when a user is in the process of getting a certain type of hearing device, such as a Behind the Ear (BTE), Receiver in Canal (RIC), In the Ear (ITE), Completely in Canal (CIC), or other types of hearing devices, the output of the device parameter may be different. For example, a BTE device may need the identification of different anatomical landmarks than a RIC device, as the devices are mounted on the ear in a completely different method, and the part of the hearing device that is to be customized may be different from the model type. One of the anatomical features that could e.g. be important for the customization of a BTE device, may be the form and size of the helix, and e.g. the positioning of the outer ear canal. For a CIC device it might be more important to obtain the positioning of certain parts of the ear canal, as the device does not come into contact with any other anatomical features of the outer human ear. Accordingly, the method may comprise identifying a first landmark set including a first anatomical landmark and a second anatomical landmark if the hearing device model identifier is indicative of a first hearing device model, and identifying a second landmark set including a first anatomical landmark and a second anatomical landmark if the hearing device model identifier is indicative of a second hearing device model, and wherein the first landmark set is different from the second landmark set.

In one or more embodiments the method may further comprise determining a scale and/or a physical dimension of the outer human ear or parts thereof, e.g. by obtaining at least one reference measurement and/or calculation of the outer human ear. The determination of a scale and/or a physical dimension of the outer human ear may improve the measurement accuracy of the image data during the identification of the anatomical landmarks. The application of the scale may be obtained in any suitable manner, where the scale can be a physical scale where the information is obtained during the obtaining of the image data. I.e. a physical dimension obtained with the image data, where the dimension data may be embedded in or form part of the image data. The physical scale can e.g. be a ruler having predefined and marked units, where the physical dimension of the outer human ear, or parts thereof, can be inferred in view of the physical scale. Alternatively, the scale may be e.g. that the viewfinder of the of the image capturing device may have a predefined area to include the outer human ear, i.e. an upper limit and a lower limit where the uppermost part of the human ear is positioned, and the lowermost part of the human ear is positioned, respectively. Alternatively, a proximity measurement device may be utilized to identify the distance from the image capturing lens to the outer human ear, which allows can enable the triangulation of the physical dimension of the outer human ear. Alternatively, the outer human ear can be measured, and the physical dimension of the outer human ear may be included attached or included as data for the method. Other methods of applying a scale to image data and/or physical dimension known by the person skilled in the art may be utilized. Yet further, the determination of a scale and/or the physical dimension may be a combination of the above or other known methods for applying a scale or a physical dimension.

In one or more embodiments the method may further comprise applying the scale and/or physical dimension to the first image data. When the scale and/or the physical dimension has been obtained, the scale and/or the dimension data may be applied to the first image data, in order to normalize the image data, so that e.g. distances, curves or other parts may be calculated or measured directly from the image data, where e.g. a distance from one identified anatomical landmark to another anatomical landmark may be measured directly from the image data, and the normalisation ensures that the distance is the actual distance between the two landmarks.

In one or more embodiments the method may further comprise applying a grid in a scaled version to the first image data, where the grid represents a predefined length unit. The application of a grid may assist the user in identifying distances and scales via the image data. The grid may e.g. be positioned in a top layer on an image of an outer human ear, where the units of the grid may be adjusted for the specific use, and e.g. also rotated or positioned in such a way that the spacing of the grid may be used to assist in determining a certain distance or curvature.

In one or more embodiments the device parameter the device parameter may be one or more of a mechanical shape of a hearing device, a physical feature of a hearing device and/or a functional feature of a hearing device Thus, the method may be utilized to optimize the shape of the earpiece, the shape of the BTE housing, the angle and/or curvature of a hearing device tube, the positioning of a BTE housing or any part of a hearing device that may be customized specifically for a particular user.

In one or more embodiments the device parameter may be a length of a hearing device tube. Some hearing devices are provided with a hearing device tube, which may connect the housing of the hearing device to an earpiece. The length of the hearing device tube may vary from person to person and may depend on where the housing sits on the ear, the positioning of the ear canal, the distance from the helix to the ear canal, or other physical factors. Thus, when a hearing device is provided with a tube, it may be important that the size of the tube is correct for the specific person and/or the specific hearing device. A too short tube may create tension in the ear, as there may be tension between the earpiece and the housing, which might cause irritation for the user. Furthermore, a too long tube may be aesthetically displeasing for the user, as the tubing may be relatively visible as it might protrude from the ear/side of the head. A common mistake in the customisation of hearing aids is to provide the tube in an incorrect length or with an incorrect curvature, which might mean that the user is not happy with the hearing device. The difference in length of one or more millimetres may be the difference between a correctly customized hearing aid and an incorrectly customized hearing aid. Thus, the determination of the tube length using the present method may increase the precision of measurements and reduce the instances of where the hearing device has to be shipped back for a correct customisation, and reduce the cost caused by a high return rate of tubes having an improper length. This will reduce the work needed to customise a hearing device and will improve the customisation process for the user.

In one or more embodiments, the act of identifying, based on the first image data, a first anatomical landmark and a second anatomical landmark of the outer human ear using a processor is performed with a processor utilizing an image recognition algorithm. The image recognition algorithm may be based on an automated recognition of patters and regularities in the image data, where the algorith may be adapted for machine learning of patterns that could be obtained from image data that represents a human ear. The image recognition algorithm may be configured to provide a recognition of certain structures of the outer human ear, and provide a probalistic estimation of the location of the structures, and return a position of the landmark. The algorithm may provide a visual representation of the output, so that an operator may be able to ensure that the quality of the recoginition of the structure is correct, and that it can be utilized to determine the device parameter. This may be highly useful in order to train the pattern recognition algorithm to improve in its pattern recognition, especially when in case the algorithm is an adaptable algorithm.

In one or more embodiments wherein identification may be, based on the first image data, a first anatomical landmark and a second anatomical landmark of the outer human ear using a processor is performed via user input through an interface. A controller may be provided with a presentation of the image data on an interface, and where the controller (user) may be capable of selecting the landmarks using a visual representation of the anatomical structures. The user may be capable of identifying the anatomical landmark manually and based on the selection the position of the first and second anatomical landmarks may be identified and based on the positions the device parameter may be calculated, as the positions of the landmarks are known.

In one or more embodiments, the device parameter is a position of an earpiece. The position of an earpiece of a hearing device may differ from one type of hearing device to the other, where both the shape and structure of the earpiece may vary, as well as the connecting portions of the earpiece may be in different areas of the earpiece. Thus, based on the identification of the first and/or second anatomical landmarks, the position of the earpiece may be determined, where the position of the earpiece may influence other device parameters of the hearing device, such as the positioning of a housing, the length of the hearing device tube, and/or the curvature of the hearing device tube.

In one or more embodiments, the method may further comprise determining a distance between the first anatomical landmark and the second anatomical landmark. The distance between the first anatomical landmark and the second anatomical landmark may be a distance along an ear surface of the outer ear between the first anatomical landmark and the second anatomical landmark. When the first and the second anatomical landmarks are identified, and their position is determined, the method may return a value of distance from the first to the second anatomical landmark. This distance may be utilized to determine the device parameter, e.g. the length of the hearing device tube of that connects the hearing device housing with the hearing device earpiece. The distance allows the operator to return a device parameter that assists in the optimising the customisation of the hearing device to the user.

In one or more embodiments, the distance between the first anatomical landmark to a second anatomical landmark may be from a point to another point, where the point may e.g. be a marked pixel in the image data. The marked pixel may be part of the anatomical landmark, where the pixel may be e.g. on an edge of the anatomical landmark, the centre of the anatomical landmark, or a predefined position of the anatomical landmark. Alternatively, the markings may be put in a layer that may be digitally superimposed on the image data, having similar coordinates, but does not include any manipulation of the image data.

In one or more embodiments, determining a distance between the first anatomical landmark and the second anatomical landmark comprises tracing a line from the first anatomical landmark to the second anatomical landmark. The tracing of a line between the first and the second anatomical landmark may e.g. be a straight line between the two positions, or a curved line that follows a certain anatomical structure of the outer human ear, or the surrounding anatomical structures of the head. This tracing may assist a user in providing an accurate distance from the first point to the second point, especially if the distance has to follow a specific anatomical structure, such as the helix, or other anatomical structures of the outer human ear.

In one or more embodiments, the identification may be or include the angle behind the helix and skull/side of head. As is well known, the shape, form and angle of the outer human ear is different from person to person. This difference may be significant from one person to the other, which may have an implication on a number of device parameters. The angle between the helix and the side of the head, e.g. the temporal region, may influence the positioning of e.g. a BTE housing. This positioning may therefore also influence the positioning of where the tube of the hearing device connects to the BTE housing, relative to the ear. Thus, if the ear sticks out from the side of the head, the positioning of the BTE housing may be different if an ear has different angle, i.e. when the helix lies close to parallel to the side of the head. Thus, the angle behind the helix and the side of the head may be considered as being a first and/or a second anatomical landmark in the context of this specification.

In one or more embodiments, the method may further comprise identifying a third anatomical landmark in the image data, and wherein determining the device parameter of the hearing device is based on the third anatomical landmark. The third anatomical landmark may be utilized to determine further structures of the outer human ear, where the first and second anatomical landmarks may be insufficient to represent the specific device parameter. This might e.g. be used to identify the curvature of the helix in addition to a distance from the helix to e.g. the upper edge of the ear canal, where the use of a first, second and/or third anatomical landmark may be utilized to the obtain this information.

In one or more embodiments, the method may further comprise transmitting the image data obtained in a decentralized location to a central server. When the image data is obtained in a decentralized location it is often a dispenser that may have been responsible to obtain the image data. The transfer of the image data to a centralized location may mean that the processing of the image data may be done in the centralized location, using a processing means that may be much powerful and/or capable than what is available in the decentralized location. Furthermore, the transmittal of the image data to a centralised location means that the image data may be utilised to train e.g. a pattern recognition algorithm, and/or that a specialized user may review the image data to provide the identification and/or to validate the identification of the first and/or the second anatomical landmarks.

In one or more embodiments, the method may further comprise obtaining a model of an ear canal of the user. The model of the ear canal of the user may be utilized to provide an optimized device parameter, in that a physical or a data representation of the ear canal may be utilized to obtain the any anatomical landmarks related to the ear canal. The anatomical landmarks related to the ear canal may be the diameter, the shape, the depth and other features that may affect the shape and/or form of the earpiece.

In one or more embodiments, the method may further comprise obtaining second image data of a second image of the outer human ear from a second angle. By obtaining a second image data of the outer human ear and process the second image data in the same manner as the first data may improve the accuracy of the positioning and thereby increase the probability that the device parameter is determined correctly. By identifying the same first and second anatomical landmarks in the first and the second image data it may be possible to determine the device parameter from two separate sources, and if there is a discrepancy between the two determinations of the device parameters a warning may be raised so that an operator will review the determination. Furthermore, some anatomical landmarks may be hidden or unclear from a first image data, while the difference in angle may improve the visibility of the anatomical landmark, thereby improving the determination.

Further, a device for determining a device parameter of a hearing device is disclosed, the device comprising a processor, a memory, and an interface, wherein the processor is configured to: obtain image data of one or more images, the image data including first image data of a first image of the outer human ear at a first angle; identify, based on the first image data, a first anatomical landmark and a second anatomical landmark of the outer human ear; identify the position of the first anatomical landmark and the second anatomical landmark in the at least one image; determine the device parameter of the hearing device based on the first anatomical landmark and the second anatomical landmark; and outputting the device parameter. Also disclosed is a device comprising a processor, a memory, and an interface, wherein the processor is configured to perform any of the methods described herein.

Different parts of the device may be distributed into one or more devices that perform similar steps and/or have functionality that perform similar steps as the disclosed device.

A method for determining a device parameter of a hearing device to be worn at a user, includes: obtaining image data of one or more images, the image data including first image data of a first image of an outer human ear at a first angle; identifying, based on the first image data, a first anatomical landmark and a second anatomical landmark of the outer human ear using a processor; determining the device parameter of the hearing device based on the first anatomical landmark and the second anatomical landmark; and outputting the device parameter.

Optionally, the method further includes applying a reference model of the outer human ear.

Optionally, the first anatomical landmark and the second anatomical landmark are recognizable anatomical features of the outer human ear.

Optionally, the first anatomical landmark comprises: Helix, Crus Antihelcis, Fossa Triangularis, Crus Helics, Antihelix, Cavum Concae, Tragus, Antitragus, Lobule, External acoustic meatus, External auditory meatus, intertragic Notch, or Cymba Concae.

Optionally, the method further includes obtaining a hearing device model identifier, wherein the act of identifying the first anatomical landmark and the second anatomical landmark of the outer human ear is performed based on the hearing device model identifier.

Optionally, the method further includes determining a scale and/or a physical dimension of the outer human ear by obtaining at least one reference measurement and/or by calculation.

Optionally, the method further includes applying a scale and/or a physical dimension to the first image data.

Optionally, the method further includes applying a grid in a scaled version to the first image data, wherein the grid represents a predefined length unit.

Optionally, the device parameter indicates or comprises a mechanical shape of the hearing device, a physical feature of the hearing device, a functional feature of the hearing device, or any combination of the foregoing.

Optionally, the device parameter is a length of a hearing device tube.

Optionally, the act of identifying the first anatomical landmark and the second anatomical landmark of the outer human ear is performed utilizing an image recognition algorithm.

Optionally, the act of identifying the first anatomical landmark and the second anatomical landmark of the outer human ear is performed based on user input through an interface.

Optionally, the device parameter is a position of an earpiece.

Optionally, the method further includes determining a distance between the first anatomical landmark and the second anatomical landmark.

Optionally, the act of determining the distance between the first anatomical landmark and the second anatomical landmark comprises tracing a line from the first anatomical landmark to the second anatomical landmark.

Optionally, the method further includes identifying a third anatomical landmark in the image data, wherein the device parameter of the hearing device is determined based also on the third anatomical landmark.

Optionally, the method further includes transmitting the image data from a decentralized location to a central server.

Optionally, the method further includes obtaining a model of an ear canal of the user.

Optionally, the method further includes obtaining second image data of a second image of the outer human ear from a second angle.

Optionally, the method further includes identifying a position of the first anatomical landmark and/or a position of the second anatomical landmark, in the first image.

A device for determining a device parameter of a hearing device, includes a processor, a memory, and an interface, wherein the processor is configured to: obtain image data of one or more images, the image data including first image data of a first image of an outer human ear at a first angle; identify, based on the first image data, a first anatomical landmark and a second anatomical landmark of the outer human ear; determine the device parameter of the hearing device based on the first anatomical landmark and the second anatomical landmark; and output the device parameter.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
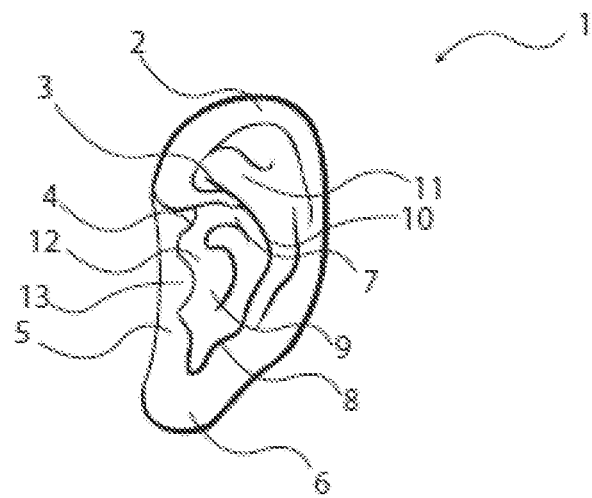
FIG. 1 is a side view of an outer human ear.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method of determining a device parameter for a hearing device is disclosed. The hearing device may be a hearable or a hearing aid, wherein the processor is configured to compensate for a hearing loss of a user. The method may further relate to a listening device or hearing device customization.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

FIG. 1 shows an outer human ear 1, where the outer human ear has a number of anatomical structures, that have a distinct shape and position on the outer human ear. The anatomical structures may be e.g. the Helix 2, Crus Antihelcis 11, Fossa Triangularis 3, Crus Helics 4, Intertragic Notch 5, Antihelix 10, Cavum Concae 9, Tragus 13, Antitragus 8, Lobule 6, External acoustic meatus 12, External auditory meatus (not shown), and Cymba Concae 7. Other anatomical structures that are recognizable on the outer human ear may also be utilized in the present method.

Figure 2:
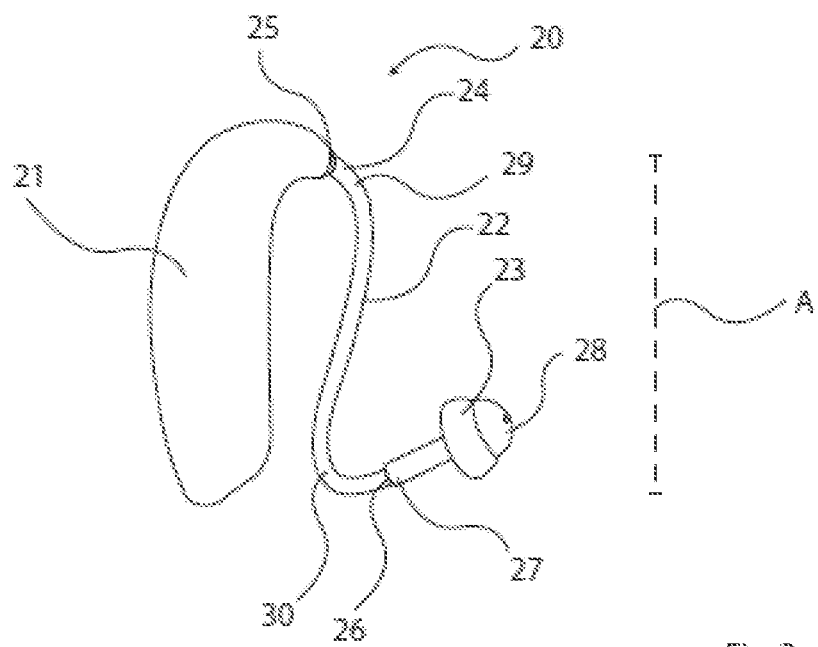
FIG. 2 is a side view of a BTE hearing device.

FIG. 2 shows a side view of a BTE hearing device 20, where the hearing device 20 comprises a housing 21 which is intended to be positioned behind the ear of a user, a hearing device tube 22 which transmits auditory signals to an earpiece 23. A first end 24 of the hearing device tube 22 is attached to a first tube connector 25 of the housing 21, and where a second end 26 of the hearing device tube 22 is attached to a second connector 27 of the earpiece 23, which is positioned opposite to the insertion part 28 of the earpiece, which is configured to be inserted into the ear canal of a user. The hearing device tube 22 is often provided with a primary bend 29 and a secondary bend 30, which allow a longitudinal axis of the earpiece to be substantially coaxial with the auditory canal of the user.

When a BTE hearing device is personalised or customised for a user, one of the device parameters that is important for the personalisation is the length A of the hearing device tube 22. If the length is too short then the earpiece will not fit properly into the ear canal, and the longitudinal axis of the earpiece will not be parallel to the central axis of the ear canal and may cause a reduced comfort for the user. If the length A of the hearing device tube 22 is too long, the hearing device tube 22 may stick out from the side of the ear and become visually displeasing for the user. Furthermore, if the hearing device tube 22 is too long, a BTE housing 21 may be improperly secured to the ear of the user, which may lead to that the BTE housing may easily fall of the ear and be lost. Thus, it may be important for the personalisation to get a proper and fitting length for the hearing device tube 22 for the specific user.

Figure 3:
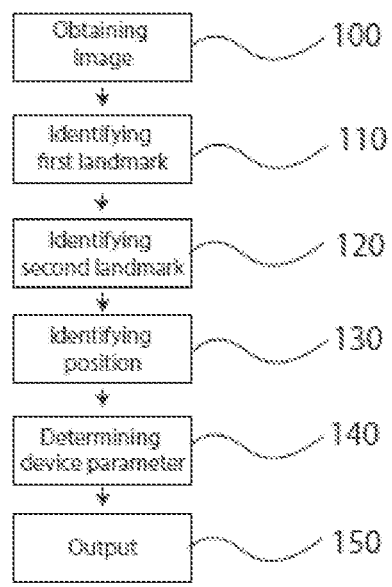
FIG. 3 is a block diagram of an exemplary method.

FIG. 3 is a schematic block diagram of a method of determining a device parameter for a hearing device. The first step of the method may be to obtain an image 100 of an outer ear of a user. The obtaining of the image may e.g. be taking a photograph of the outer ear and introducing the photograph into a processor, memory of a processor, a computer, a mobile phone or other types of processing devices that are capable of running computer programs.

When the image has been obtained the first anatomical landmark may be identified 110 from the image data received in step 100. Following this the second anatomical landmark may be identified 120 from the image data received in step 100. When the first and the second anatomical landmarks have been identified, the positions of the landmarks, or parts of the landmarks may be identified 130. When the positions of the first and second anatomical landmarks have been identified, it is possible to utilize these positions to provide e.g. a distance between the two positions and/or a distance between two points defined by the anatomical landmarks, where the distance may be utilized to establish a device parameter 140, such as the length A of a hearing device tube, as shown in FIG. 2, where the length of the tube may be provided as an output 150 for a specialist that is customising the hearing device for a user. The output may then be utilised to cut the length of the hearing device tube in the correct length, and to bend it in the correct places in accordance with the anatomy of the ear, and thereby provide a reliable personalisation of the hearing device tube (device parameter) for the user.

Within the understanding of the present disclosure, other device parameters, such as the positioning of the housing, size of the housing, size of the earpiece, curvature of the tubing and other parts of the hearing device may be defined as a device parameter that can be determined using the present method.

Figure 4:
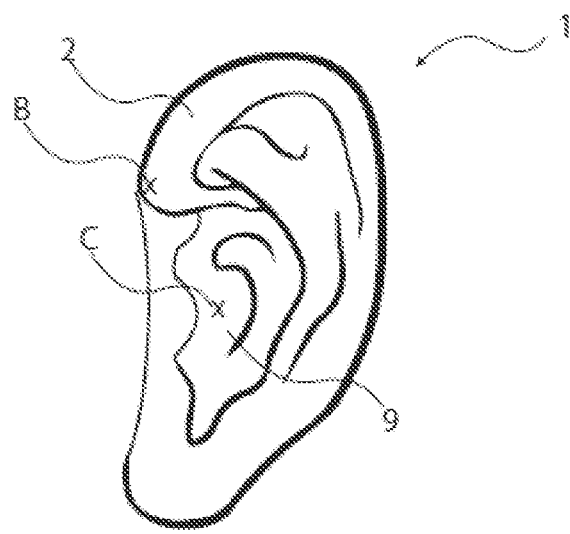
FIG. 4 shows an exemplary identification of anatomical landmarks.

FIG. 4 shows an example of the identification of a first and a second anatomical landmarks, where the identification of a certain position of the landmarks may be utilized to measure a distance between the two positions, where the distance may be representative of a device parameter such as the tube length of the hearing device. In this example, the first anatomical landmark of the outer human ear 1 is the Helix 2, and the second anatomical landmark is the cavum concae 9. The position of the first anatomical landmark may be the lowest leftmost point of the Helix 2 marked as B in FIG. 4, while the position of the second anatomical landmark may be the center of the cavum concae 9, marked as C in FIG. 4. By identifying the specific anatomical landmarks, it is possible to indicate which part of the anatomical landmark is important for the specific device parameter. If another device parameter is to be obtained, it may be possible to identify a different first and second anatomical landmark for that purpose. As an example, for the shape of a BTE housing, the curvature of the Helix and e.g. the position and/or curvature of the Cruz Antihelix or Fossa Triangularis may be assessed in a similar manner.

Figure 5:
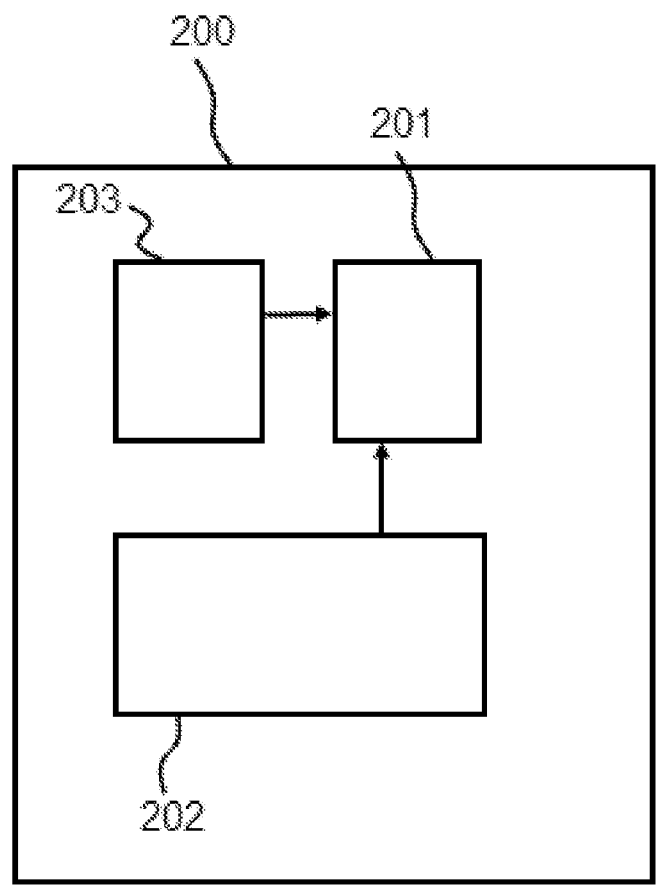
FIG. 5 shows a block diagram of a device for determining a device parameter for a hearing device.

FIG. 5 shows a block diagram of a device for determining a hearing device parameter 200. The device comprises a processor 201, memory 202, and an interface 203 to provide a communication with a user or a secondary device, e.g. a server.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1. Outer human ear
2. Helix
3. Fossa Triangularis
4. Crus Helics
5. Intertragic Notch
6. Lobule
7. Cymba Concae
8. Antitragus
9. Cavum Concae
10. Antihelix
11. Crus Antihelics
12. External acoustic meatus
13. Tragus
20. BTE hearing device
21. Housing
22. Hearing device tube
23. Earpiece
24. First end of hearing device tube
25. First tube connector
26. Second end of the hearing device tube
27. Second connector of the housing
28. Insertion part of earpiece
29. Primary bend of hearing device tube
30. Secondary bend of hearing device tube
100. Obtaining of image
110. Identification of first anatomical Landmark
120. Identification of second anatomical Landmark
130. Identification of positions of anatomical landmarks
140. Establish a device parameter
150. Output
200. Device for determining a hearing device parameter
201. Processor
202. Memory
203. Interface
A. Length of hearing device tube
B. Position of first anatomical landmark
C. Position of second anatomical landmark.

The invention claimed is:

1. A method for determining a device parameter of a hearing device to be worn at a user, the method comprising:
   obtaining image data of one or more images, the image data including first image data of a first image of an outer human ear at a first angle;
   identifying, based on the first image data, a first anatomical landmark and a second anatomical landmark of the outer human ear using a processor;
   determining the device parameter of the hearing device based on the first anatomical landmark and the second anatomical landmark; and
   outputting the device parameter;
   wherein the method further comprises obtaining a hearing device model identifier, and wherein the act of identifying the first anatomical landmark and the second anatomical landmark of the outer human ear is performed also based on the hearing device model identifier; and wherein the act of determining the device parameter of the hearing device based on the first and second anatomical landmarks, and the act of outputting the device parameter, are performed after at least a housing of the hearing device has been manufactured.

2. The method in accordance with claim 1, further comprising applying a reference model of the outer human ear.

3. The method in accordance with claim 1, wherein the first anatomical landmark and the second anatomical landmark are recognizable anatomical features of the outer human ear.

4. The method in accordance with claim 1, wherein the first anatomical landmark comprises: Helix, Crus Antihelcis, Fossa Triangularis, Crus Helics, Antihelix, Cavum Concae, Tragus, Antitragus, Lobule, External acoustic meatus, External auditory meatus, intertragic Notch, or Cymba Concae.

5. The method in accordance with claim 1, further comprising determining a scale and/or a physical dimension of the outer human ear by obtaining at least one reference measurement and/or by calculation.

6. The method in accordance with claim 5, further comprising applying a scale and/or a physical dimension to the first image data.

7. The method in accordance with claim 1, further comprising applying a grid in a scaled version to the first image data, wherein the grid represents a predefined length unit.

8. The method in accordance with claim 1, wherein the device parameter indicates or comprises a mechanical shape of the hearing device, a physical feature of the hearing device, a functional feature of the hearing device, or any combination of the foregoing.

9. A method for determining a device parameter of a hearing device to be worn at a user, the method comprising:
obtaining image data of one or more images, the image data including first image data of a first image of an outer human ear at a first angle;
identifying, based on the first image data, a first anatomical landmark and a second anatomical landmark of the outer human ear using a processor;
determining the device parameter of the hearing device based on the first anatomical landmark and the second anatomical landmark; and
outputting the device parameter;
wherein the device parameter is a length of a hearing device tube;
wherein the first anatomical landmark and/or the second anatomical landmark is associated with a curvature, and wherein the device parameter is based on the curvature; and
wherein the act of determining the device parameter of the hearing device based on the first and second anatomical landmarks, and the act of outputting the device parameter, are performed after at least a housing of the hearing device has been manufactured.

10. The method in accordance with claim 1, wherein the act of identifying the first anatomical landmark and the second anatomical landmark of the outer human ear is performed utilizing an image recognition algorithm.

11. The method in accordance with claim 1, wherein the act of identifying the first anatomical landmark and the second anatomical landmark of the outer human ear is performed based on user input through an interface.

12. The method in accordance with claim 1, wherein the device parameter is a position of an earpiece.

13. The method in accordance with claim 1, further comprising determining a distance between the first anatomical landmark and the second anatomical landmark.

14. The method in accordance with claim 13, wherein the act of determining the distance between the first anatomical landmark and the second anatomical landmark comprises tracing a line from the first anatomical landmark to the second anatomical landmark.

15. The method in accordance with claim 1, further comprising identifying a third anatomical landmark in the image data, wherein the device parameter of the hearing device is determined based also on the third anatomical landmark.

16. The method in accordance with claim 1, further comprising transmitting the image data from a decentralized location to a central server.

17. The method in accordance with claim 1, further comprising obtaining a model of an ear canal of the user.

18. The method in accordance with claim 1, further comprising obtaining second image data of a second image of the outer human ear from a second angle.

19. The method in accordance with claim 1, further comprising identifying a position of the first anatomical landmark and/or a position of the second anatomical landmark, in the first image.

20. A device for determining a device parameter of a hearing device that has been at least partially manufactured, the device comprising a processor, a memory, and an interface, wherein the processor is configured to:
obtain image data of one or more images, the image data including first image data of a first image of an outer human ear at a first angle;
identify, based on the first image data, a first anatomical landmark and a second anatomical landmark of the outer human ear;
determine the device parameter of the hearing device that has been at least partially manufactured, wherein the processor is configured to determine the device parameter based on the first anatomical landmark and the second anatomical landmark after a housing of the hearing device is manufactured; and
output the device parameter;
wherein the processor is also configured to obtain a hearing device model identifier, and wherein the processor is configured to identify the first anatomical landmark and the second anatomical landmark of the outer human ear also based on the hearing device model identifier.

* * * * *